Aug. 16, 1932.  D. A. MONRO  1,871,819
FRACTIONATING SYSTEM
Filed April 25, 1931   2 Sheets-Sheet 1

Inventor:
Donald A. Monro.
By Bruce K. Brown Atty

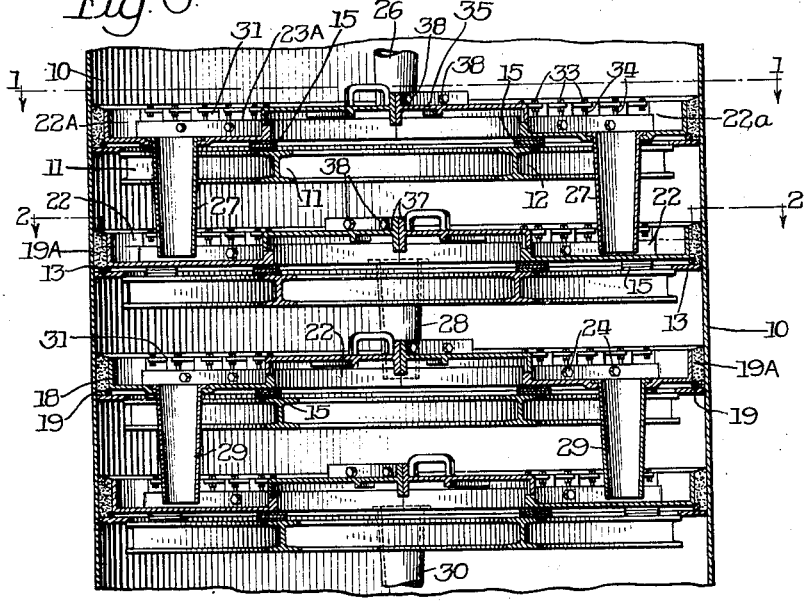

Patented Aug. 16, 1932

1,871,819

UNITED STATES PATENT OFFICE

DONALD A. MONRO, OF HAMMOND, INDIANA, ASSIGNOR TO STANDARD OIL COMPANY, OF CHICAGO, ILLINOIS, A CORPORATION OF INDIANA

FRACTIONATING SYSTEM

Application filed April 25, 1931. Serial No. 532,821.

This invention relates to fractionating systems and it pertains more particularly to bubble plates in fractionating towers for contacting hot hydrocarbon vapors with reflux liquid.

The object of my invention is to obtain uniform and intimate contact between the vapors and the reflux liquid. A further object is to provide a simple compact and efficient fractionating tower which is readily accessible for repair and/or replacement. A further object is to provide a fractionating tower in which fractionation will not be impaired by substantial increase or decrease of liquid flow. A further object is to decrease surging and to insure uniform distribution and contact of gases and vapors.

I accomplish these results by providing a simple bubble plate structure utilizing a straight line flow and designed so that the distance between the inlet oil pool and the discharge oil pool on any plate is the same no mater what path the liquid takes. In other words, the reflux liquid is caused to flow in parallel channels of the same length, and no matter how much liquid is flowing in the system, it will be equally distributed in these channels and will be uniformly contacted with the vapors bubbling in said channels.

My invention will be more clearly understood from the description of a preferred embodiment which is illustrated in the accompanying drawings wherein similar parts are designated by similar reference characters throughout the several views and wherein—

Figure 3 is a vertical section along the lines 3—3 of Fig. 1;

Figure 4 is a vertical section along the lines 4—4 of Fig. 1, and

Figure 5 is a vertical section of the bubble cap regulating means.

Figure 1:
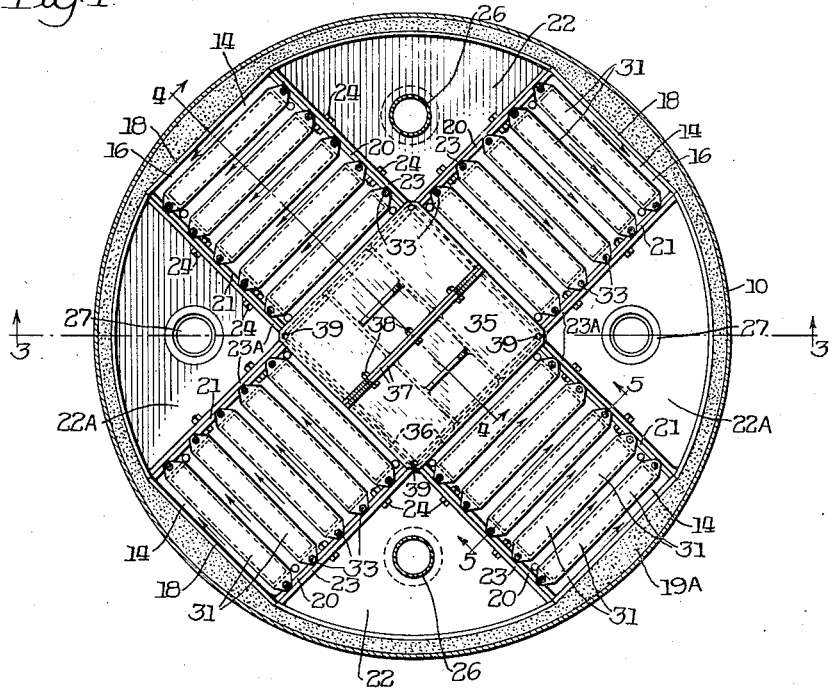
Figure 1 is a horizontal section along the lines 1—1 of Fig. 3.
Figure 2:
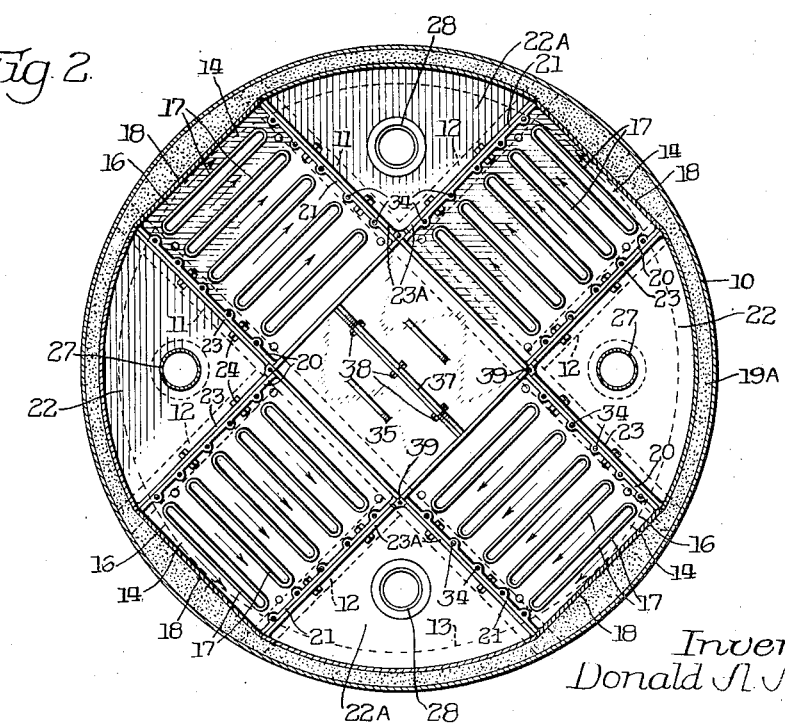
Figure 2 is a horizontal section along the lines 2—2 of Fig. 3.

The fractionating tower 10 may contain any number of bubble trays and it may be provided with suitable flash chambers and stripping means in the base, reflux cooling means in the top, entrainment arresters, etc. These features form no part of the present invention and they are not described in detail. In the accompanying drawings I have shown the arrangement of three or four bubble plates or trays, and my new and improved method and means for obtaining uniform vapor-liquid contact.

At intervals along the length of the tower I provide a pair of transverse supporting members 11, which are preferably steel channels or I-beams. These supports are preferably parallel to each other and are spaced at a distance from the center equal to about three-eighths of the radius so that the distance between the supporting members is about 0.38 the diameter of the tower.

At right angles to these supporting members I provide similarly spaced supports 12 which extend from the side of the tower to supporting members 11. These supports may be secured to the tower and to each other in any suitable manner, as by welding, riveting, etc.

The area of the horizontal cross section of the tower may be considered as roughly divided into a central square, a rectangular area extending from each side of the square, and a triangular area between rectangular areas. The outsides of the rectangular and triangular areas may be circular, but for the purposes of this disclosure they will be considered as one side of the triangle or rectangle.

Above supports 11 and 12 I provide an annular ring 13 (see Figs. 3 and 4), which may be welded to the sides of the tower. Over each of the rectangular spaces I mount a rectangular bubble plate section 14, spacers 15 being interposed between the plate section and supports 11 and 12 so that the section may be leveled. The spacers may also be used as splash arresters or entrainment arresters, as will be hereinafter described. In the bottom 16 of this plate section I provide a plurality of elongated, equally spaced vapor uptakes or chimneys 17. The outer edge is preferably straight and it is provided with a relatively long, upwardly extending flange 18. An asbestos rope 19 is placed between the bottom of the plate section and flange 13, and the space between flange 18 and the tower is filled with cement 19A or other filler which will maintain a gas-tight seal and which will not be affected by temperature changes or the action of hot hydrocarbon fluids.

The lateral sides of the plate section consist of upwardly turned flanges 20 and 21 (see Fig. 1) flange 20 being slightly higher than flange 21. Each of the other rectangular plate sections are similarly mounted on the supports 11 and 12 around a square central aperture and are placed with their high lateral flanges adjacent to each other.

A triangular section or receptacle 22 is fit into each triangular space between the rectangular plate sections. Flanges 23 on the sides of these triangular plates are preferably the same height as the flanges on the plate sections against which they are placed, the plate section and the triangular receptacle being firmly held together by bolts 24. Each of the triangular receptacles acts as a container for a pool of oil and the side flanges act as dams over which the oil may flow. The lower receptacles on each plate are provided with apertures surrounded by annular depressions or equivalent means for mounting downtake pipes. Oil is conducted to or from the triangular receptacles by means of downtake pipes 26, 27, 28, 29, 30, etc. in the order named.

In order to utilize the space of the plates to the greatest advantage I prefer to so construct its parts that the length of one side of the square central aperture will bear a ratio to the radius of the column of approximately 0.77 to 1.0. This arrangement insures that the effective bubbling area of the plate will approximate the maximum obtainable.

From the above description it will be seen that the liquid from the upper part of the tower, which may be condensed vapor or reflux from an outside source, is passed down through pipes 26 into pools in triangular receptacles 22. It then flows over the upper dams (flanges 23 and 20), across the rectangular plate sections 16 and over the lower dams (flanges 23A and 21) into triangular receptacles 22A (note arrows in Fig. 1), from which it is discharged through pipes 27 to the plates below. On each plate the upper dam acts as a weir, so that a uniform liquid head is maintained and so that equal streams will flow between the vapor uptakes or chimneys 17. Every stream is the same length as every other stream, the head is the same in all cases, and therefore the liquid is evenly distributed.

Above each of the vapor uptakes or chimneys 17 I provide a bubble cap 31, which has a downwardly depending notched flange or skirt 32 and which may be regulated and held in fixed position by adjusting bolts 33 on rod 34 which passes through the end of each cap and which is anchored in or supported by flanges or dams 20 and 21. The notched skirt 32 causes an even distribution of vapors along the liquid stream.

It will be noted that the square aperture in the center of the tower is left open. A manhole is provided in the top and/or bottom of the tower and the center of the manhole is aligned with this open shaft in the center of the tower so that access may be had for replacement, adjustment or repair. Instead of closing the aperture in the center of each plate with a gas tight seal, I provide a rectangular cover 35 which is slightly larger than the aperture and which is provided with a downwardly extending notched flange 36 on all four sides. This cover is preferably made in two sections, abutting flanges 37 which are held together by suitable bolts 38. Depending flanges 36 are spaced from the bottom of the various plate sections and from the inner flanges thereof by suitable spacing means 39. The inner plate section flanges which surround the square central aperture are preferably a little higher than uptake chimneys 17.

It will thus be seen that the central space is utilized as an uptake or chimney, and the vapors are bubbled under notched flange 36 and through the adjacent liquid streams.

The system hereinabove described is compact, simple and efficient. Short circuiting is eliminated, surging is minimized and the vapor-liquid contact is increased many fold.

If reflux liquid is added to the tower I prefer to add it in equal increments to opposite triangular receptacles. Liquid may be withdrawn from any plate or added thereto, and various refinery processes may be combined with the above features without departing from my invention.

The spacers or leveling means 15 may be supplemented by or may consist of metal plates which lie beneath the area of the vapor uptakes 17 and which therefore act as splash or entrainment arresters. Instead of using one long vapor uptake, I may use a plurality of circular or angular vapor uptakes; such a system might not give straight line flow but it would still utilize other features of my invention.

While I have described in detail a preferred embodiment of the invention it is understood that I do not limit myself except as defined by the following claims.

I claim:

1. In combination, a fractionating tower, parallel supporting members secured therein, transverse parallel supporting members in substantially the same plane as the first members, a plurality of substantial rectangular plate sections mounted on said supports around a rectangular central opening, substantially triangular receptacles mounted between said rectangular plate sections, a cover for said central opening, downtake pipes from opposite triangular receptacles to alternately arranged triangular receptacles thereneath, a plurality of vapor uptakes in each plate section whereby liquid may flow from one triangular receptacle to another in streams of substantially equal length, and means for passing vapor through said uptake and for introducing said vapor into said streams.

2. In apparatus of the class described, a tower, a plurality of bubble plates in said tower, each plate comprising a plurality of substantially rectangular bubble plate sections arranged in said tower to leave a substantially square central aperture, triangular receptacles between adjacent rectangular sections, means for causing liquid to flow from one triangular receptacle across the adjacent rectangular sections to other triangular receptacles, a plurality of vapor uptakes in each section extending substantially the width of the rectangular sections, bubble caps over said uptakes, and means for closing said central aperture.

3. The combination of claim 2 wherein the means for closing the aperture consists of a plate having downwardly depending notched flanges whereby the central aperture may be used as a vapor uptake.

4. In apparatus of the class described, a bubble plate comprising four substantially rectangular plate sections having high side and low side flanges, means for supporting said sections whereby a substantially square central aperture is formed and whereby the high sides of said sections are juxtaposed, triangular receptacles between said plate sections, means for delivering a liquid into the triangular receptacle between juxtaposed high sides of plate sections, means for causing the liquid to flow across said rectangular sections in substantially straight lines into other triangular receptacles, and means for conveying the liquid from said last named triangular receptacles into receptacles on a lower plate between the juxtaposed high sides of rectangular plate sections.

5. In a bubble tower having a plurality of superimposed plates, a bubble plate comprising four substantially rectangular plate sections disposed around the sides of a central square aperture, means for closing said aperture sets of diametrically opposed liquid receptacles between said plate sections, means for causing liquid to flow from one set of diametrically opposed receptacles to another set of other diametrically opposed receptacles in streams of substantially equal length across said plate sections, means for uniformly contacting said streams with vapors, and means for discharging liquids from the second named receptacles into receptacles in a lower plate which correspond to the first named receptacles.

6. The combination of claim 5 wherein the means for closing the aperture consists of a plate having downwardly depending notched flanges whereby the central aperture may be used as a vapor uptake.

7. In a bubble tower having a plurality of superimposed plates, a plurality of alternate upper and lower liquid receptacles around each plate, plate sections between each contiguous upper and lower liquid receptacle, said plate sections being disposed around a central aperture, means for closing said central aperture, means for introducing liquid into the upper receptacles, means for causing the liquid to flow from said upper receptacles across both adjacent plate sections into the contiguous lower receptacles in streams of substantially equal length across said plate sections, means for uniformly contacting said streams with vapors, and means for discharging liquids from lower receptacles on one plate into upper receptacles on a lower plate.

8. The combination of claim 7 wherein the means for closing the aperture consists of a plate having downwardly depending notched flanges whereby the central aperture may be used as a vapor uptake.

In witness whereof I have affixed my signature.

DONALD A. MONRO.